United States Patent [19]

Thompson

[11] 4,108,782
[45] Aug. 22, 1978

[54] FOAMING AND SILT SUSPENDING AGENT

[75] Inventor: James L. Thompson, Tulsa, Okla.

[73] Assignee: The Dow Chemical Company, Midland, Mich.

[21] Appl. No.: 791,628

[22] Filed: Apr. 27, 1977

Related U.S. Application Data

[63] Continuation-in-part of Ser. No. 713,168, Aug. 10, 1976, and a continuation-in-part of Ser. No. 716,508, Aug. 23, 1976, Pat. No. 4,028,257, which is a continuation of Ser. No. 527,577, Nov. 27, 1974, abandoned.

[51] Int. Cl.$^2$ .................. E21B 43/27; E21B 43/26
[52] U.S. Cl. ................. 252/8.55 C; 166/307; 166/308; 252/8.55 R; 252/8.55 B
[58] Field of Search ........... 252/8.5 R, 8.5 C, 8.55 R, 252/8.55 C, 8.55 D, 355, 8.55 B; 166/307, 308

[56] References Cited

U.S. PATENT DOCUMENTS

| | | | |
|---|---|---|---|
| 2,717,876 | 9/1955 | Menaul | 252/8.55 |
| 2,759,019 | 8/1956 | Brown et al. | 252/355 X |
| 3,111,178 | 11/1963 | Marsh et al. | 252/8.5 X |
| 3,122,204 | 2/1964 | Oakes | 252/8.55 X |
| 3,254,713 | 6/1966 | Scherr et al. | 252/8.55 X |
| 3,303,896 | 2/1967 | Tillotson et al. | 166/309 X |
| 3,937,283 | 2/1976 | Blauer et al. | 166/307 |
| 4,028,257 | 6/1977 | Thompson | 252/8.55 |

*Primary Examiner*—Herbert B. Guynn
*Attorney, Agent, or Firm*—G. H. Korfhage; Bruce M. Kanuch

[57] ABSTRACT

A foaming and silt suspending agent is disclosed containing (A) at least one alkyltrimethylammonium chloride; (B) an amine oxide selected from the group consisting of bis-(2-hydroxyethyl) cocoamine oxide, dimethylhexadecylamine oxide, and dimethyl-hydrogenated tallowamine oxide; (C) an adduct of trimethyl-1-heptanol plus seven moles of ethylene oxide; and (D) a perfluorinated compound corresponding to the formula

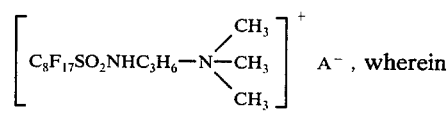

A$^-$, wherein A$^-$ is Cl$^-$, I$^-$, F$^-$ or Br$^-$, preferably I$^-$. The agent is particularly useful in a variety of aqueous based fluids of the type used in treating subterranean formations, including fluids containing other cationic additives such as certain acid inhibitors and clay stabilization agents which tend to impair the effectiveness of prior art agents.

29 Claims, No Drawings

FOAMING AND SILT SUSPENDING AGENT

CROSS-REFERENCE TO RELATED APPLICATIONS

This is a continuation-in-part application of U.S. patent application Ser. No. 713,168 filed Aug. 10, 1976 by James L. Thompson, "Foaming and Silt Suspending Agent." This is also a continuation-in-part of U.S. Pat. application Ser. No. 716,508 filed Aug. 23, 1976 by James L. Thompson, "Composition and Method for Reducing the Surface Tension of Aqueous Fluids," now U.S. Pat. No. 4,028,257 issued June 7, 1977, which is a continuation of U.S. patent application Ser. No. 527,577 filed Nov. 27, 1974 and now abandoned.

BACKGROUND OF THE INVENTION

A. Field of the Invention

This invention relates to foaming and silt suspending compositions, and to a method of employing same, particularly in the context of treating subterranean formations.

B. Description of the Prior Art

Use of aqueous based stable foams in treating subterranean formations, such as in acidizing and/of fracturing to stimulate the production of oil and gas therefrom, or in well clean-up operations such as may comprise an initial or final step in an overall stimulation treatment, has been known in the art for several years. Such foams generally contain a surfactant as an aid to generating and/or stabilizing the foam, i.e., a foaming agent.

It is also known to employ silt suspending agents in aqueous fluids for treating subterranean formations, particularly in acidizing fluids or in fluids for well clean-up immediately following an acidizing treatment, since failure to remove formation fines released during acidizing can result in decreased well productivity as a result of formation plugging and/or emulsification of the valuable formation fluids.

Silt suspending agents are generally cationic or amphoteric surfactants which provide silt suspending, water wetting, surface tension reducing, and to some extent, foaming, properties. Conventional silt suspending surfactants, however, do not perform well as foaming agents per se. On the other hand, the most efficient foaming agents of the prior art, which are generally anionic or nonionic surfactants, are not themselves sufficiently effective as silt suspending agents. Moreover, the nonionic and particularly the anionic foaming agents generally do not perform well in certain types of frequently employed aqueous based treating fluids, e.g., heavy brines, inhibited acids, and fluids containing cationic additives such as zirconium oxychloride, a frequently used clay stabilization agent.

Accordingly, a composition was sought which would be sufficiently stable to be stored, transported, and otherwise handled as a single item in inventory; which would impart both outstanding foaming and outstanding silt suspending properties to aqueous based fluids of the type suitable for use in treating subterranean formations; and which would be effective in a variety of such fluids, including fresh water, brine, acid, inhibited acid, and fluids containing other cationic additives. The aqueous liquids may contain gelling agents so long as the gelling agent is not present in an amount making foaming impossible. Also, the fluids may contain noninterfering functional additives, such as freeze point depressants, weighting agents, proppants, alcohols, cationic additives such as clay stabilization agents, and the like.

Art which has been cited in said Ser. Nos. 716,508 and 527,577 include Brown et al., U.S. Pat. Nos. 3,759,019; Bond, 2,765,851; Hower, 2,803,306; Oakes, 3,122,204; Scherr et al., 3,254,713; Pye et al., 3,711,405; and Francen, 3,772,195.

Art cited in Ser. No. 713,168 includes Findlan et al., U.S. Pat. Nos. 3,296,145; Marsh et al., 3,111,178; Tillotson et al., 3,303,896; Blauer et al., 3,937,283; Priestley et al., 3,317,430; Priestley, 3,324,183; Guenther et al., 2,169,976; Menaul, 2,717,876; Plummer et al., 3,980,136; and Drew et al., 3,223,647, as well as an advertisement at page 11 of Soap and Chemical Specialties, October 1974.

SUMMARY OF THE INVENTION

A composition has now been discovered which satisfies the foregoing objectives. Accordingly, one aspect of the present invention is the composition itself, namely a blend of (A) at least one alkyltrimethylammonium chloride, wherein the alkyl chain length is from 8 to 18 carbon atoms and the mode, i.e., most frequently occurring, alkyl chain length is 12 or 14 carbon atoms, (B) an amine oxide selected from the group consisting of bis-2(hydroxyethyl) cocoamine oxide, dimethylhexadecylamine oxide, and dimethyl-hydrogenated tallowamine oxide, (C) an adduct of trimethyl-1-heptanol plus seven moles of ethylene oxide, and (D) a perfluorinated compound corresponding to the formula

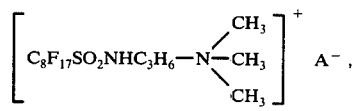

wherein $A^-$ is $Cl^-$, $I^-$, $F^-$ or $Br^-$, preferably $I^-$. Another aspect of the invention is a foam of the type containing an aqueous based fluid, an inert gas, and an effective amount of the blend hereinabove described to impart foaming and silt suspending properties to the foam. A further aspect of the invention is a method of treating a subterranean formation comprising injecting into the formation, an aqueous based fluid containing a foaming and silt suspending quantity of said blend.

FURTHER DESCRIPTION OF THE INVENTION

A blend of Components (A) and (B) particularly suited for use as a surfactant blend to impart foaming and silt suspending properties to aqueous based fluids of the type suitable for use in treating subterranean formations is disclosed in said Ser. No. 713,168; such a blend is sometimes referred to herein as a "'168 Blend" for convenience.

A blend of Components (C) and (D) is disclosed in said Ser. No. 716,508; such a blend is sometimes referred to herein as a "'508 Blend" for convenience.

It has now been discovered that a surfactant blend containing both the '508 Blend and also the '168 Blend has certain additional advantages. For example, although the '508 blend is itself a relatively poor foaming agent, addition of a certain amount of the '508 Blend to the '168 Blend enhances the initial foam volume over that obtained with the '168 Blend alone. Also, the presence of some of the '168 Blend reduces the surface tension of the liquid phase of the foam over that obtained with the '508 Blend alone, thereby permitting more efficient well clean-up, e.g., removal of the spent acid following a foamed acid treatment. Furthermore, tests indicate the blend described herein has a tendency to absorb onto the surface of the formation particles at a much lesser extent than either the '508 Blend or the '168 Blend alone. Since the combined blend tends to be absorbed less, solutions containing the blend can penetrate the formation more easily.

The essential components employed in the present invention are themselves known, commercially available compounds. The teachings of two Product Data Bulletins, each published in 1972 by the Aramak Chemicals Division of Akzona, Inc. of Chicago, Illinois are incorporated herein by reference, to wit: "Aromox ® Amine Oxides" and "Bulletin No. 72-12, Arquad ® Quaternary Ammonium Salts."

Component (A), the alkyltrimethylammonium chloride, is at least one quaternary ammonium salt of the formula

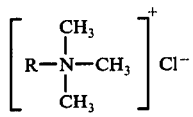

wherein R represents a long hydrocarbon chain which may vary from 8 to 18 carbon atoms. Although Component (A) may be a single quaternary compound, i.e., each R being identical, as a practical matter, Component (A) will most always comprise a blend wherein the hydrocarbon chain represented by R in the foregoing formula differs from molecule to molecule. Where Component (A) is a single species, R contains 12 or 14 carbon atoms. Where Component (A) is a blend of several species, the most frequently occurring length for R in the blend is 12 or 14 carbons.

Component (A) may be provided by a commercial solution of the active ingredient in a suitable solvent, so long as the solvent is compatible with the aqueous based fluid to be foamed and with the subterranean formation at the concentration to be employed, as can readily be determined by those skilled in the art using routine laboratory procedures. A commercial product which has been satisfactorily used as a source of Component (A) is Arquad 12-50 brand dodecyltrimethylammonium chloride, which is reported to contain, by weight, about 50% quaternary ammonium salt, about 1% sodium chloride, about 34% isopropanol, and the balance water. The quaternary ammonium salt portion of Arquad 12-50 is said to have the following alkyl moiety distribution: dodecyl (12 carbons), about 90%; tetradecyl (14 carbons), about 9%; and octadecenyl (18 carbons), about 1%.

A source of Component (A) preferred when considered from both an overall performance and economic standpoint is Arquad C-50 brand cocotrimethylammonium chloride. The commercial product is said to have a specific gravity at 25° C of 0.889 and is said to contain, by weight, about 50% quaternary ammonium salt, about 1% sodium chloride, about 36% isopropanol, and about 13% water. The quaternary ammonium salt portion of Arquad C-50 is said to have the following alkyl moiety distribution: octyl (8 carbons), about 8%; decyl (10 carbons), about 9%; dodecyl (12 carbons), about 47%; tetradecyl (14 carbons), about 18%; hexadecyl (16 carbons), about 8%; and octadecyl and octadecenyl (18 carbons each), about 5% each.

Component (B) may be any of the three amine oxides hereinabove mentioned. The amine oxide component may also be provided in a suitable solvent, such as aqueous isopropanol, if desired.

When each of Components (A) and (B) is present in the blend in significant amounts, e.g., a respective weight ratio of 1:99 to 99:1, such a blend is capable of imparting synergistic foaming and silt suspending properties to at least one of, and at many ratios and species, more than one of, the types of aqueous fluids commonly used in treating subterranean formations, e.g., fresh water, brines, acids such as hydrochloric acid, and inhibited acids. By synergism is meant that such an aqueous fluid containing an effective amount of the '168 Blend has superior properties in at least one of initial foam volume, foam half life, and silt suspending ability according to the tests hereinafter described than would be predictable from the separate performance of the amine oxide component alone and the quaternary ammonium salt alone in a comparable test on an otherwise substantially identical aqueous fluid when the separate components are each tested at a concentration in the fluid equal to that of the total concentration of the amine oxide and the quaternary ammonium salt, and which has a performance equal to or better than that which would be predictable in each of the other two test categories.

Although synergism can be obtained in at least one of the commonly used types of treating fluids using any significant ratio of Component (A) to Component (B) in the blend, it is normally desired to employ a ratio wherein foaming properties and silt suspending properties are balanced, each at an acceptably high level, though neither may necessarily be at the optimum level attainable for that particular property in the particular aqueous treating fluid using a somewhat different ratio. It is also desirable to provide a blend which has a reasonably high level of performance in the greatest variety of fluids.

Accordingly, it is preferred that the weight ratio of Component (A) to Component (B) be from about 40:60 to about 95:5, except where Component (A) is cocotrimethyl ammonium chloride, such as that provided by the commercial product Arquad C-50 hereinabove described, and Component (B) is bis-(2-hydroxyethyl) cocoamine oxide, in which case a ratio of from about 45:55 to about 85:15 is preferred. The most preferred ratios for a blend generally suited for most types of aqueous subterranean treating fluids is from about 75:25 to about 95:5, except for blends of cocotrimethyl ammonium chloride and bis-(2-hydroxyethyl) cocoamine oxide, in which case a ratio of from about 60:40 to about 80:20 is most preferred.

A sufficient quantity of Components (A) and (B) is employed in an aqueous treating fluid to impart the desired degree of foaming and silt suspending properties to the fluid. Because of the presence of the '508 Blend this amount is somewhat less than required for the same amount of foaming using the '168 Blend alone. For example, an amount which is usually sufficient according to the present invention is from about 0.035 to about 0.5 percent total alkyl trimethylammonium plus amine oxide based on the total weight of the aqueous fluid to be foamed, although the exact amount may vary depending on the fluid to be foamed. Since slightly increased corrosion may result at the higher concentrations and for economic considerations, it is preferred to employ from about 0.045 to about 0.18 percent total Component (A) and Component (B) in the aqueous fluid to be foamed, except where the aqueous fluid is an inhibited mineral acid, where the preferred range is about 0.13–0.4 percent. Also the beneficial effect of the '508 Blend is less apparent at the higher concentrations of the '168 Blend.

Component (C) and Component (D) are combined in a weight ratio to one another (C:D) ranging from about 1:1 to about 40:1. At a ratio of 40:1 and less, the more readily available Component (C) does not significantly detract from the outstanding surface tension reducing properties of Component (D) as do many other surfactants. Ratios of less than 1:1 are much less economically favorable, and more rapid absorption of Component (D) on the formation would be anticipated than at higher ratios.

Components (C) and (D) are employed in a combined amount ranging from about 0.03 to about 0.1 percent by weight of the aqueous liquid. Lesser and greater amounts show little benefit in increasing the initial foam volume over that obtainable with the '168 Blend alone. Although the presence of the '508 Blend enhances initial foam volume obtainable with the '168 Blend within the above concentrations, it does somewhat impair the foam stability as measured by the foam half life. This can be tolerated to a certain extent, however, and sometimes is desirable. It is preferred to employ Components (C) and (D) in a combined concentration of from about 0.037 to about 0.07 weight percent.

The individual surfactants can be blended directly into an aqueous treatment liquid or they can be premixed and easily blended into a treatment liquid employing standard equipment employed in fracturing and acidizing treatments. The premix may also contain water, mono and/or polyhydric alcohols, and other functional additives.

The novelty of the method aspects of this invention lies in the use of the particular ingredients for the stated purpose, not in the manipulative steps per se. Accordingly, foams may be generated from the blend of surfactants described herein plus an aqueous fluid to be foamed plus an inert gas such as $CO_2, N_2$, and the like or a combination of such gases, in any conventional manner, either above ground, or, within the earth using as at least part of the inert gas, gas released by a phase transition, by a reaction, or by a series of reactions, occurring within the earth.

EXAMPLES AND COMPARISON RUNS

A further understanding of the invention is facilitated by the following specific runs, which are provided by way of illustration only and not as limitations of the invention.

A number of different types of tests were run using various surfactants, blends of surfactants, and aqueous fluids to be foamed. A description of each type of test follows:

INITIAL FOAM VOLUME TEST

Into a Waring Blendor laboratory blender was poured 100 milliliters (ml) of the aqueous fluid to be foamed. To this was added the stated quantity of surfactant blend. The mixture was gently stirred with a glass rod to insure uniform distribution of the surfactant. The blender was then operated at its high speed setting for exactly 30 seconds, as measured using a stop watch. The foam was immediately poured into a graduated cylinder, and the foam volume read in milliliters.

FOAM HALF-LIFE TEST

The column of foam obtained as described above was observed and the time recorded at which the foam had deteriorated to a point such that a 50 ml layer of liquid had accumulated beneath the foam. This time period is referred to as the foam half life. The volume of the foam plus the 50 ml layer of separated liquid was recorded in some instances, and is reported as foam half life volume.

It should be noted that the data from both the Initial Foam Volume and Foam Half-Life Tests may not be quantitatively reproducible with a different blender, although the same qualitative patterns should be observable.

SILT SUSPENDING TEST

To a 100 ml ASTM pear-shaped oil tube was added 0.5 gram bentonite conforming to the following particle size distribution specifications (U.S. Sieve Series): 99–100% through 100 mesh, 90–95% through 200 mesh, and 70–77% through 325 mesh. To the tube was then added 100 ml of the fluid to be evaluated. The tube and its contents were vigorously shaken for 60 seconds and the volume of the solids which had settled at various time intervals from 1 to 30 minutes was measured.

SURFACE TENSION TESTS

Surface tension tests were run using a DuNony Tensiometer.

For brevity in some of the Tables which follow, some of the commercial products are identified by trademark. The compositions of Arquad C-50 and Arquad 12-50 are described above under caption III. The compositions of the Aromox brand amine oxides are as follows:

Aromox C/12—an approximately 50 weight percent solution of bis-(2 hydroxyethyl) cocoamine oxide in aqueous isopropanol Aromox DM16D—an approximately 40 weight percent solution of dimethylhexadecylamine oxide in aqueous isopropanol Aromox DMHTD—an approximately 40 weight percent solution of dimethylhydrogenated tallowamine oxide in aqueous isopropanol.

SERIES ONE —'168 BLEND

The data reported in the following Tables 1 through 7 demonstrates the general effectiveness of the '168 Blend when used as a foaming and silt suspending agent.

Surfactant blends were made up from various combinations of Arquad and Aromox products as shown in Table 1. Fluids were prepared by adding 1 percent by volume of each of the blends. respectively, to respective aliquots of API brine (by weight, 8% NaCl and 2.5% $CaCl_2$). The results of Initial Foam Volume Tests on the resulting fluids are tabulated in Table 1, along with the results of comparison runs not illustrative of the '168 invention, where only one or the other of the surfactants was used. Since Arquad C-50 and 12/50, and Aromox C/12 each contain 50 weight percent active ingredients, the total of Component (A) and Component (B) in each of the brines in the test runs employing blends of those products only was approximately 0.5 weight percent. To avoid confusion, however, it should be noted that the Aromox DM16 and DMHTD products contain only 40 weight percent active ingredients, so that the total of Component (A) and Component (B) in each of the brines in the test runs employing either of those two products declined in proportionate increments from about 0.5 percent to about 0.4 percent as the ratio of Arquad to Aromox declined.

Foam screening tests were conducted using literally hundreds of different commercially available surfactants in distilled water. Approximately 10 percent of those tested in fresh water were selected for additional testing in API brine and in hydrochloric acid. Among

TABLE I

INITIAL FOAM VOLUME OF API BRINE

| Volume Ratio in Blend Arquad:Aromox | Arquad C-50 Aromox C/12 | Arquad C-50 Aromox DM16D | Arquad C-50 Aromox DMHTD | Arquad 12/50 Aromox C/12 | Arquad 12/50 Aromox DM16D | Arquad 12/50 Aromox DMHTD |
|---|---|---|---|---|---|---|
| 100:0 | 445 | 445 | 445 | 430 | 430 | 430 |
| 90:10 | 425 | 455 | 450 | 440 | 465 | 465 |
| 75:25 | 450 | 405 | 430 | 435 | 440 | 455 |
| 50:50 | 425 | 350 | 380 | 430 | 395 | 425 |
| 25:75 | 355 | 315 | 290 | 350 | 340 | 310 |
| 0:100 | 370 | 235 | 220 | 370 | 235 | 220 |

A similar series of tests was run using 1 volume percent of the blend of commercial products in 15 weight percent hydrochloric acid. Results are tabulated in Table 2.

the most satisfactory commercial products was a nonionic surfactant containing a sulfated, ethoxylated linear alcohol, an alkanolamine, a fatty acid amide, and a fatty ester, identified in the following tables as Comparison

TABLE 2

INITIAL FOAM VOLUME OF 15% HCl

| Volume Ratio in Blend, Arquad:Aromox | Arquad C-50 Aromox C/12 | Arquad C-50 Aromox DM16D | Arquad C-50 Aromox DMHTD | Arquad 12/50 Aromox C/12 | Arquad 12/50 Armox DM16D | Arquad Aromox Armomox DMHTD |
|---|---|---|---|---|---|---|
| 100:0 | 415 | 415 | 415 | 410 | 410 | 410 |
| 90:10 | 430 | 445 | 420 | 425 | 440 | 425 |
| 75:25 | 435 | 415 | 375 | 420 | 420 | 410 |
| 50:50 | 410 | 365 | 320 | 415 | 365 | 330 |
| 25:75 | 400 | 205 | 215 | 395 | 305 | 250 |
| 0:100 | 360 | 175 | 175 | 360 | 175 | 175 |

Table 3 shows the results of Initial Foam Volume tests on various types of fluids commonly used for treating subterranean formations containing one volume percent of the blend of Arquad and Aromox products in the ratios indicated. Also shown in Table 3, in the figures in parentheses, are the results of Foam Half-Life tests on the same compositions. In Table 3 and those which follow, "A130 Inhibitor" refers to an inhibitor of the Dowell Division of The Dow Chemical Company known in the trade as Dowell A130 inhibitor. It is a Mannich reaction product inhibitor of the type disclosed in U.S. Pat. No. 3,077,454, also containing a short chain acetylenic alcohol. Similarly, "A170S Inhibitor" refers to Dowell A170S inhibitor, another Mannich reaction product type inhibitor, also containing a mixture of acetylenic alcohols.

Surfactant 1. (Comparison runs with two other surfactants which performed well in the initial tests were not carried further when it was found both performed poorly in inhibited acids.) Table 4 shows the Initial Foam Volume and, in parentheses, the Foam Half-Life of various fluids containing, respectively, 1 percent by volume of Comparison Surfactant 1 or a blend of the invention of Ser. No. 713,168 comprising a 75:25 blend, by the volume of Arquad C-50 and Aromox C/12.

TABLE 3

INITIAL FOAM VOLUME IN MILLILITERS AND (FOAM HALF-LIFE IN SECONDS) OF VARIOUS FLUIDS WITH 1% OF ARQUAD/AROMOX BLENDS

| Arquad Product | C-50 | C-50 | 12/50 | C-50 | 12/50 | C-50 | 12/50 |
|---|---|---|---|---|---|---|---|
| Aromox Product | C/12 | C/12 | C/12 | DM16D | DM16D | DMHTD | DMHTD |
| Aqueous Treating Fluid | 75:25* | 90:10 | 90:10 | 90:10 | 90:10 | 90:10 | 90:10 |
| 15% HCl + 0.3% A170S Inhibitor | 360 (250) | 380 (287) | 370 (283) | 350 (222) | 375 (280) | 355 (232) | 360 (268) |
| 15% HCl + 0.3% A130 Inhibitor | 330 (220) | 310 (180) | 310 (205) | 300 (132) | 310 (194) | 315 (165) | 325 (194) |
| 3% HCl + 0.3% A170S Inhibitor | 400 (250) | 360 (210) | 425 (255) | 380 (202) | 400 (253) | 335 (160) | 400 (255) |
| 3% HCl + 0.3% A130 Inhibitor | 360 (208) | 360 (135) | 350 (195) | 315 (118) | 355 (191) | 295 (110) | 360 (200) |
| 2% KCl | 522 (312) | 545 (317) | 540 (297) | 510 (310) | 560 (272) | 545 (294) | 550 (277) |
| 2% KCl + 2% a 20% soln. of zirconium oxychloride | 550 (303) | 545 (300) | 525 (290) | 565 (290) | 595 (268) | 550 (294) | 585 (264) |
| 2% CaCl$_2$ | 560 (305) | 530 (310) | 520 (300) | 515 (305) | 550 (283) | 540 (293) | 545 (275) |
| 2% CaCl$_2$ + 2% a 20% soln. of zirconium oxychloride | 525 (309) | 515 (295) | 525 (283) | 535 (306) | 550 (280) | 540 (294) | 545 (278) |

*Arquad:Aromox volume ratio

TABLE 4
INITIAL FOAM HEIGHT IN MILLILITERS AND (FOAM HALF-LIFE IN SECONDS) OF VARIOUS FLUIDS WITH 1% of 75:25 BLEND OF ARQUAD C-50 AND AROMOX C/12 VERSUS 1% OF COMPARISON SURFACTANT 1

| Aqueous Testing Fluid | Arquad/Aromox Blend | Comparison Surfactant 1 |
|---|---|---|
| 15% HCl + 0.3% A170S Inhibitor | 360 (250) | 300 (160) |
| 15% HCl + 0.3% A130 Inhibitor | 330 (220) | 285 (120) |
| 3% HCl + 0.3% A170S Inhibitor | 400 (250) | 275 (200) |
| 3% HCl + 0.3% A130 Inhibitor | 360 (208) | 345 (125) |
| 2% KCl | 522 (312) | 505 (302) |
| 2% KCl + 2% a 20% solution of zirconium oxychloride | 550 (303) | 310 (135) |
| 2% CaCl$_2$ | 560 (305) | 490 (305) |
| 2% CaCl$_2$ + 2% a 20% solution of zirconium oxychloride | 525 (309) | 310 (135) |
| API Brine | 450 (340) | 395 (260) |
| API Brine + 2% a 20% solution of zirconium oxychloride | 430 (320) | 370 (210) |
| Fresh Water | 610 | 575 |
| Simulated spend acid, i.e. 20.4% CaCl$_2$ | (380) 410 (471) | (345) 380 (325) |

The two blends for which results were reported in Table 4 for runs at a 1% concentration were run at various concentrations in an aqueous solution containing 2% KCl and 2% a 20% solution of zirconium oxychloride. The results are tabulated in Table 5.

TABLE 5
Initial Foam Height in Milliliters And (Foam Half-Life In Seconds) Of An Aqueous Solution Of 2% KCl And 2% A 20% Solution Of Zirconium Oxychloride With Various Concentrations Of A 75:25 Blend Of Arquad C-50 And Aromox C/12 Versus Same Concentrations Of Comparison Surfactant 1

| Concentration | Arquad/Aromox Blend | Comparison Surfactant 1 |
|---|---|---|
| 0.1% | 270 (120) | 170 (20) |
| 0.2% | 315 (171) | 200 (45) |
| 0.5% | 435 (317) | 265 (80) |
| 1.5% | 648 (305) | 335 (205) |
| 2.0% | 738 (300) | 395 (250) |

Silt suspending tests were conducted with various surfactants, including a 75:25 blend of Arquad C-50 and Aromox C/12, using a 15% hydrochloric acid solution containing 0.6% A170S Inhibitor and using a solution of 24.4% calcium chloride to simulate spent acid. Each surfactant formulation was employed in an amount equal to 1 volume percent of the total treating fluid. Results of these tests are tabulated in Table 6.

TABLE 6
VOLUME OF SILT SETTLED AS A FUNCTION OF TIME FOR VARIOUS SURFACTANT FORMULATIONS IN INHIBITED ACID AND SIMULATED SPENT ACID

| Time Minutes | Arquad/Aromox Blend | Arquad C-50 Alone | Aromox C-12 Alone | Comparison Surfactant 1 | Comparison Surfactant 2* | Comparison Surfactant 3** |
|---|---|---|---|---|---|---|
| Live Acid System: | | | | | | |
| 1 | 0.2 | 0.3 | 0.2 | 0.2 | 0.2 | 0.2 |
| 2 | 0.3 | 0.3 | 0.5 | 0.5 | 0.2 | 0.3 |
| 3 | 0.4 | 0.4 | 0.6 | 0.7 | 0.4 | 0.4 |
| 4 | 0.5 | 0.5 | 0.6 | 0.7 | 0.5 | 0.5 |
| 5 | 0.5 | 0.5 | 0.7 | 0.8 | 0.6 | 0.5 |
| 10 | 0.6 | 0.6 | 0.8 | 1.1 | 0.8 | 0.8 |
| 20 | 0.7 | 0.7 | 0.9 | 1.2 | 0.9 | 0.9 |
| 30 | 0.8 | 0.8 | 1.0 | 1.3 | 0.9 | 0.9 |
| Spend Acid System: | | | | | | |
| 1 | 0.2 | 0.2 | 0.2 | 0.1 | <0.1 | 0.1 |
| 2 | 0.3 | 0.4 | 0.3 | 0.2 | 0.1 | 0.2 |
| 3 | 0.3 | 0.5 | 0.5 | 0.3 | 0.2 | 0.3 |
| 4 | 0.4 | 0.6 | 0.6 | 0.5 | 0.3 | 0.4 |
| 5 | 0.4 | 0.7 | 0.7 | 0.6 | 0.3 | 0.5 |
| 10 | 0.5 | 0.8 | 0.9 | 2.3 | 0.7 | 0.7 |
| 20 | 0.6 | 1.0 | 1.1 | 2.3 | 0.8 | 0.9 |
| 30 | 0.7 | 1.1 | 1.2 | 2.3 | 1.0 | 1.1 |

Notes
*An aqueous alcoholic solution of N-alkyl beta-amino propionates.
**Dialkanol fatty amide and glycol fatty ester blend.

Thus, Comparison Surfactant 1, although fairly satisfactory, was nevertheless inferior to the '168 Blend of the present invention in both silt suspending and foaming properties. Comparison Surfactant 2, a fairly good slit suspending agent, did not exhibit good foaming properties, generating, for example, an Initial Foam Volume of only 425 ml in fresh water, compared to 610 ml using the 75:25 Arquad C-50:Aromox C/12 blend. Similarly, Comparison Surfactant 3 was not an adequate foaming agent, generating only 195 ml foam in the fresh water test hereinabove described.

Silt suspension tests were also run using different concentrations of the 75:25 Arquad C-50:Aromox C/12 blend and Comparison Surfactant 2 on fluids substantially identical to those used for the runs tabulated in Table 6. Results of these tests, tabulated in Table 7 show that the silt suspending superiority of the Arquad:Aromox blend over Comparison Surfactant 2 is even more apparent at lower concentrations.

TABLE 7

Volume Of Silt Settled As A Function Of Time For Surfactant Formulations At Various Concentrations In Inhibited Acid And Simulated Spent Acid

| Time (Minutes) | No Surfactant | 0.1 Volume Percent A/A Blend* | 0.1 Volume Percent CS2** | 0.2 Volume Percent A/A Blend | 0.2 Volume Percent CS2 | 0.5 Volume Percent A/A Blend | 0.5 Volume Percent CS2 |
|---|---|---|---|---|---|---|---|
| Live Acid System: | | | | | | | |
| 1 | 2.0 | 1.0 | 1.5 | 0.5 | 1.2 | 0.5 | 0.7 |
| 2 | 3.3 | 1.2 | 2.4 | 0.9 | 1.6 | 0.7 | 0.9 |
| 3 | 4.4 | 1.7 | 2.9 | 1.2 | 1.7 | 0.7 | 1.0 |
| 4 | 4.7 | 2.0 | 3.1 | 1.3 | 1.8 | 0.8 | 1.0 |
| 5 | 4.7 | 2.1 | 3.1 | 1.4 | 1.8 | 0.8 | 1.1 |
| 10 | 4.7 | 2.2 | 3.1 | 1.4 | 1.8 | 0.9 | 1.1 |
| 20 | 4.7 | 2.3 | 3.1 | 1.5 | 1.8 | 0.9 | 1.2 |
| 30 | 4.7 | 2.3 | 3.1 | 1.5 | 1.9 | 0.9 | 1.3 |
| Spent Acid System: | | | | | | | |
| 1 | 0.2 | 0.3 | 0.3 | 0.3 | 0.2 | 0.2 | 0.2 |
| 2 | 0.6 | 0.5 | 0.6 | 0.4 | 0.5 | 0.4 | 0.4 |
| 3 | 1.0 | 0.7 | 0.9 | 0.5 | 0.6 | 0.5 | 0.5 |
| 4 | 1.3 | 0.9 | 1.3 | 0.6 | 1.0 | 0.6 | 0.6 |
| 5 | 1.4 | 1.0 | 1.4 | 0.7 | 1.1 | 0.7 | 0.7 |
| 10 | 1.6 | 1.1 | 1.5 | 0.9 | 1.2 | 0.8 | 0.8 |
| 20 | 1.7 | 1.2 | 1.5 | 1.0 | 1.3 | 0.9 | 1.0 |
| 30 | 1.8 | 1.3 | 1.5 | 1.1 | 1.4 | 1.0 | 1.1 |

Notes
*75:25 Arquad C-50:Aromox C/12 blend
**Comparison Surfactant 2

Series Two—'508 Blend

The data reported in the following Tables 8 through 10 demonstate the general effectiveness of the '508 Blend as a surface tension reducing agent.

A '508 Blend was prepared containing as parts by weight: 2916 parts H$_2$O; 3185 parts isopropyl alcohol; 1535 parts of an adduct of trimethyl-1-heptanol plus seven moles of ethylene oxide; and 40 parts of the iodide salt of the previously defined perfluorinated compound. Aqueous mixtures were prepared in proportions of 2 gallons of the '508 Blend in 1000 gallons of various liquids. The surface tension of the mixtures was determined employing a DuNouy Tensiometer. The liquids employed, their original surface tensions and the resulting surface tension are set forth in the following Table 8.

TABLE 8

| Test *** | Liquid | Final Surface Tension Dynes/cm. | Original Surface Tension Dynes/cm. |
|---|---|---|---|
| 1 | 3 HCl* | 18.0 | 32.1 |
| 2 | 7.5 HCl | 17.9 | 31.3 |
| 3 | 15 HCl | 17.5 | 30.2 |
| 4 | 28 HCl | 18.3 | 30.1 |
| 5 | 12-3 HCl-HF | 18.2 | 31.5 |
| 6 | Spent 3 HCl** | 18.2 | 36.2 |
| 7 | Spent 15 HCl** | 24.2 | 34.5 |
| 8 | H$_2$O | 21.2 | 72.0 |
| 9 | Brine*** | 22.0 | 74.3 |

*The number indicates strength of acid in weight percent. All the acids contained about a .52 percent by weight of A170S Inhibitor.
**Spent acid was prepared by reacting the live acid with a sufficient quantity of CaCO$_3$ to neutralize the acid.
***The brine was an aqueous solution containing 8 percent by weight of sodium chloride and 2.5 percent of calcium chloride.

To demonstrate that not all surfactants can be combined with Component (D) without detracting from the outstanding surface tension reducing properties of Component (D), various preblends were prepared. A control preblend contained as Component (D), by weight, 0.5 parts of the iodide salt of the perfluorinated compound hereinabove described, 41.5 parts isopropyl alcohol, and 58 parts water. Each of the other preblends was similar to the control preblend, except that rather than 58 parts water, each contained 38 parts water and 20 parts of each of the surfactants respectively identified in Table 9 below. Aqueous solutions were prepared by separately admixing with 15 weight percent hydrochloric acid, 0.2 percent of the respective blends, based on the volume of the 15% acid solution. The acid also contained 0.6 percent by weight Dowell A170S corrosion inhibitor. However, the inhibitor was from a different commercial batch than that employed in Run 3 of Table 8. The surface tension of the various acid samples was determined. The surface tension measurements were made on the first six runs in Table 1 approximately 21 hours after the sample was prepared, and within 30 minutes of preparation in the case of the ast three runs.

TABLE 9

| Surfactant Used in Combination with Perfluorinated Compound | Surface Tension of Acid Dynes/cm |
|---|---|
| Control (i.e., Component (D) alone) | 20.1 |
| Component (C) (i.e., a '508 Blend) | 20.1* |
| C$_{10}$-C$_{12}$ alcohol + 5 moles ethylene oxide (Alfonic 1012-60; Continental Oil Co.) | 24.1 |
| Alcohol ether sulfate (Adofoam BF-1; Nalco Chemical Co.) | 24.2 |
| Di-sec.-butylphenol + 10 moles ethylene oxide | 22.6 |
| Linear alcohol + ethylene oxide (Tergitol Speed Wet; Union Carbide) | 24.3 |
| 75% Dioctyl sodium sulfosuccinate (Aerosol OT; American Cyanamide Co) | 27.9 |
| Sorbitan Monooleate (Span 80; ICI American, Inc.) | 22.6 |
| Alkyl phenoxy polyethoxyethanol (Triton X-305; Rohm & Hass) | 21.9 |

*It is suspected the reason for the variance between this figure and the 17.5 dynes/cm figure reported for Run 3 in Table 8 is attributable to batch variation in the corrosion inhibitor formulation.

To demonstrate that Component (C) does not significantly change the surface tension reducing properties of Component (D) at weight ratios (C:D) of 40:1 and less, preblends were prepared containing various ratios of Components (C) and (D) in aqueous ispropanol. Aqueous solutions were then prepared by separately admixing with 15 weight percent hydrochloric acid, 0.2 percent of the respective preblends, based on the volume of the 15% acid solution. The acid also contained 0.6 percent by weight of yet another batch of Dowell A170S corrosion inhibitor. The surface tension of the various samples was determined 24 hours after the respective sample solution was prepared. Compositions of the preblends and results of the surface tension tests are tabulated in Table 10.

TABLE 10

| Component (parts by weight) | Other surfactant:Perfluorinated Surfactant Weight Ratio | | | | | |
|---|---|---|---|---|---|---|
| | 80:1 | 60:1 | 40:1 | 10:1 | 1:1 | 0.5:1 |
| Component (C) | 20.25 | 20.16 | 20.00 | 18.64 | 10.25 | 6.83 |
| Component (D) | 0.25 | 0.34 | 0.50 | 1.86 | 10.25 | 13.67 |
| Isopropyl alcohol | 41.50 | 41.50 | 41.50 | 41.50 | 41.50 | 41.50 |
| Water | 38.00 | 38.00 | 38.00 | 38.00 | 38.00 | 38.00 |
| Total | 100.00 | 100.00 | 100.00 | 100.00 | 100.00 | 100.00 |
| Surface Tension (dynes/cm) | 29.2 | 28.0 | 17.8 | 17.4 | 17.9 | 17.6 |

SERIES THREE—CONTAINING EACH OF COMPONENTS A,B,C, AND D

In the remaining runs, the '508 Blend was in each instance derived from a commercial formulation, the standard recipe for which calls for admixture of 350 gallons of water, 486 gallons of isopropyl alcohol (99% grade), 184 gallons of an adduct of trimethyl-1-heptanol and 7 moles ethylene oxide, and 40 pounds of the iodide salt form of Component (D). Thus, the '508 Blend contained by weight, about 0.5 percent Component (D), and about 20 percent Component (C).

The '168 Blend contained, by volume, 75 percent Arquad C-50 brand solution of cocotrimethylammonium chloride and 25 percent Aromox C/12 brand solution of bis-(2-hydroxyethyl) cocoamine oxide (approximately 50% active in aqueous isopropanol having a specific gravity at 25° C of 0.9486. Hence, the '168 Blend contained, by weight, about 36.9 percent Component (A) and 13.1 percent Component (B).

The foaming properties of each of Blends '168 and '508 were separately evaluated in an aqueous solution of 2 weight percent KCl. The results, shown in Table 11, illustrate that the '508 Blend is not by itself a very effective foaming agent.

TABLE 11
FOAMING PROPERTIES OF '168 BLEND AND '508 BLEND WHEN SEPARATELY EMPLOYED IN 2% KCl

| Surfactant Blend | Concentration (Vol%) | Initial Foam Volume (ml) | Half Life (seconds) | Half Life (Volume (ml)) |
|---|---|---|---|---|
| '168 | 0.10 | 280 | 120 | 270 |
| '508 | 0.10 | 170 | 23 | 170 |
| '168 | 0.25 | 355 | 196 | 345 |
| '508 | 0.25 | 210 | 36 | 210 |
| '168 | 0.50 | 455 | 264 | 430 |
| '508 | 0.50 | 245 | 48 | 240 |
| '168 | 0.75 | 525 | 272 | 505 |
| '508 | 0.75 | 285 | 60 | 280 |
| '168 | 1.00 | 585 | 268 | 565 |
| '508 | 1.00 | 300 | 72 | 295 |

Various amounts of the '508 and '168 Blends were added to 2 weight percent KCl and the foaming properties observed. Results are shown in Table 12. Data in parentheses are extrapolated from plots of the data in Table 11.

TABLE 12
FOAMING PROPERTIES OF MIXTURES OF '168 and '508 BLENDS IN 2% KCl

| Concentration, Volume % | | Initial Foam Volume,ml | Foam Half Life,sec. | Half Life Volume,ml |
|---|---|---|---|---|
| '168 | '508 | | | |
| 0 | 0.10 | 170 | 23 | 170 |
| 0 | 0.15 | (185) | (28) | (185) |
| 0 | 0.20 | (195) | (32) | (195) |
| 0 | 0.30 | (217) | (38) | (217) |
| 0 | 0.40 | (233) | (44) | (231) |
| 0.1 | 0 | 290 | 120 | 280 |
| 0.1 | 0.10 | 290 | 90 | 280 |
| 0.1 | 0.15 | 285 | 98 | 280 |
| 0.1 | 0.20 | 300 | 102 | 295 |
| 0.1 | 0.30 | 305 | 100 | 295 |
| 0.1 | 0.40 | 300 | 84 | 285 |
| 0.2 | 0 | 325 | 174 | 315 |
| 0.2 | 0.10 | 325 | 125 | 315 |
| 0.2 | 0.15 | 325 | 123 | 315 |
| 0.2 | 0.20 | 350 | 126 | 340 |
| 0.2 | 0.30 | 340 | 132 | 330 |
| 0.2 | 0.40 | 335 | 100 | 330 |
| 0.3 | 0 | 355 | 200 | 345 |
| 0.3 | 0.10 | 335 | 155 | 325 |
| 0.3 | 0.15 | 365 | 150 | 360 |
| 0.3 | 0.20 | 370 | 156 | 360 |
| 0.3 | 0.30 | 375 | 167 | 360 |
| 0.3 | 0.40 | 360 | 130 | 350 |
| 0.4 | 0 | 378 | 205 | 360 |
| 0.4 | 0.10 | 385 | 174 | 370 |
| 0.4 | 0.20 | 390 | 173 | 380 |
| 0.4 | 0.30 | 400 | 170 | 385 |
| 0.4 | 0.40 | 410 | 168 | 390 |
| 2.0 | 0 | 790 | 283 | 785 |
| 2.0 | 0.5 | 750 | 250 | 740 |

From Table 12, it will be observed that at the lower concentrations of '168 Blend, the '508 Blend had little effect on the foam height obtainable with the '168 Blend when the '508 Blend is employed at 0.15 volume percent and less. At '168 Blend concentrations of 0.4 volume percent, it can be observed the great advantage realized at 0.1–0.3 percent '168 Blend by use of the '508 Blend begins to diminish. At high concentrations of '168 Blend, the '508 Blend is actually somewhat detrimental.

In Table 13, the results of similar tests are reported, wherein the aqueous fluid was 3 weight percent HCl containing 0.4 volume percent Dowell A170S inhibitor. Data in parentheses are extrapolated from plots of other data reported in the Table. Where more than one run was made, data for first and second runs are separated by a slash. By "Immediate Drainage" is meant that 50 ml or more of the liquid had already separated before transfer of the foam from the blender to the graduate could be completed.

TABLE 13
FOAMING PROPERTIES OF MIXTURES OF '168 AND '508 BLENDS IN 3 PERCENT INHIBITED HCl

| Concentration, Volume % | | Initial Foam Volume, ml | Foam Half Life, sec. | Half Life Volume, ml |
|---|---|---|---|---|
| '168 | '508 | | | |
| 0 | 0.1 | 105 | Immediate Drainage | |
| 0 | 0.2 | (117) | (Immediate Drainage) | |

TABLE 13-continued
FOAMING PROPERTIES OF MIXTURES OF '168 AND '508 BLENDS IN 3 PERCENT INHIBITED HCl

| Concentration, Volume % | | Initial Foam Volume, ml | Foam Half Life, sec. | Half Life Volume, ml |
|---|---|---|---|---|
| '168 | '508 | | | |
| 0 | 0.25 | 125 | Immediate Drainage | |
| 0 | 0.3 | (133) | (Immediate Drainage) | |
| 0 | 0.5 | 155 | Immediate Drainage | |
| 0 | 0.75 | 160 | Immediate Drainage | |
| 0 | 1.0 | 170 | Immediate Drainage | |
| 0.1 | 0 | 115 | Immediate Drainage | |
| 0.1 | 0.1 | 110 | Immediate Drainage | |
| 0.1 | 0.2 | 115 | Immediate Drainage | |
| 0.1 | 0.3 | 140 | Immediate Drainage | |
| 0.1 | 0.4 | 215 | 35 | 215 |
| 0.2 | 0 | (140) | (Immediate Drainage) | |
| 0.2 | 0.1 | 110 | Immediate Drainage | |
| 0.2 | 0.2 | 240 | 42 | 240 |
| 0.2 | 0.3 | 200 | 42 | 200 |
| 0.2 | 0.4 | 270 | 83 | 270 |
| 0.25 | 0 | 155 | Immediate Drainage | |
| 0.3 | 0 | (176) | — | — |
| 0.3 | 0.1 | 205/125 | 37/Im.Dr. | 205/Im.Dr. |
| 0.3 | 0.2 | 295 | 76 | 280 |
| 0.3 | 0.3 | 330/315 | 80/88 | 325/310 |
| 0.3 | 0.4 | 295/310 | 87/82 | 290/300 |
| 0.4 | 0 | 225 | 53 | 225 |
| 0.4 | 0.1 | 205/165 | 33/29 | 205/165 |
| 0.4 | 0.2 | 325 | 97 | 320 |
| 0.4 | 0.3 | 340 | 95 | 315 |
| 0.4 | 0.4 | 355 | 120 | 335 |
| 0.5 | 0 | 275 | 78 | 270 |
| 0.6 | 0 | (315) | | |
| 0.6 | 0.1 | 335/230 | 95/225 | 330/47 |
| 0.6 | 0.2 | 300/310 | 100/87 | 290/300 |
| 0.6 | 0.3 | 320/360 | 97/162 | 315/315 |
| 0.6 | 0.4 | 350/390 | 106/169 | 335/380 |
| 0.75 | 0 | 355 | 152 | 345 |
| 0.8 | 0 | (362) | | |
| 0.8 | 0.1 | 380 | 139 | 360 |
| 0.8 | 0.2 | 455 | 240 | 420 |
| 0.8 | 0.3 | 485 | 243 | 460 |
| 0.8 | 0.4 | 500/415 | 242/209 | 465/390 |
| 1.0 | 0 | 380 | 161 | 380 |
| 1.0 | 0.1 | 455 | 244 | 435 |
| 1.0 | 0.2 | 480 | 239 | 450 |
| 1.0 | 0.3 | 480 | 230 | 420 |
| 1.0 | 0.4 | 470/485 | 238/232 | 440/445 |
| 2.0 | 0 | 615 | 264 | 605 |
| 2.0 | 0.5 | 595 | 251 | 580 |

In another series of tests, 0.3 volume percent of the '168 Blend and 0.2 volume percent of the '508 Blend were added to a 2 weight percent aqueous KCl brine containing as an oxygen scavenger, 250 parts per million of a mixture of, by weight, 90% sodium hydrosulfite and 10% a polyphosphate stabilizing agent. Data for parallel runs were as follows: Initial Foam Height, 350/360 ml.; Foam Half-Life, 158/159 sec.; Half-Life Volume, 340/350 ml.

The data in Table 14, run on a 2 weight percent KCl solution containing 2 volume percent of a 20 weight percent solution of zirconium oxychloride, demonstrates the blend of the present invention is effectively employed in the presence of clay stabilization agents.

TABLE 14
FOAMING PROPERTIES IN THE PRESENCE OF ZIRCONIUM OXYCHLORIDE

| Concentration, Volume % | | Initial Foam Volume, ml. | Foam Half Life, sec. | Half Life Volume, ml. |
|---|---|---|---|---|
| '168 | '508 | | | |
| 0.1 | 0.4 | 330/340 | 111/115 | 320/335 |
| 0.3 | 0.2 | 350/350 | 163/167 | 330/340 |
| 0.4 | 0.1 | 375/380 | 193/195 | 345/350 |

A series of tests was conducted to evaluate the blend of the present invention in the presence of zirconium oxychloride in acid, in the presence of organic acids, and in the presence of other inhibitors. In Table 15, the solutions formed each contained 1 volume percent of the '168 Blend and 0.2 volume percent of the '508 Blend. The remaining components of the respective compositions were as follows:

Solution I: 7.5 weight percent HCl containing 2 volume percent Dowell A170S, and 10 volume percent a 20 weight percent solution of zirconium oxychloride;

Solution II: 7.65 weight percent (9 × .85 grade) formic acid, 2 volume percent Tret-O-Lite AK-7 brand inhibitor, and 10 volume percent of the above zirconium oxychloride solution;

Solution III: Same as II except 10% acetic acid in lieu of the 7.65% formic acid;

Solution IV: Same as I except half the concentration of zirconium oxychloride;

Solution V: Same as II except half the concentration of zirconium oxychloride;

Solution VI: Same as III except half the concentration of zirconium oxychloride;

Solution VII: Same as I, except without inhibitor; and

Solution VIII: Same as I, except half the concentration of inhibitor.

TABLE 15
0.3% '168 BLEND AND 0.2% '508 BLEND IN ACIDS WITH CLAY STABILIZER

| Solution | Initial Foam Volume, ml | Foam Half Life, sec. | Half Life Volume, ml |
|---|---|---|---|
| I | 175 | 20 | 170 |
| II | 500 | 255 | 455 |
| III | 510 | 275 | 455 |
| IV | 165 | 20 | 160 |
| V | 520 | 255 | 470 |
| VI | 515 | 265 | 475 |
| VII | 450 | 330 | 425 |
| VIII | 305 | 155 | 300 |

The surface tension of various concentrations of the '168 and '508 Blend in 2% KCl was determined. Results are tabulated in Table 16.

TABLE 16
SURFACE TENSION, 2% KCl

| Concentration, Volume % | | Corrected Surface Tension dynes/cm |
|---|---|---|
| '168 | '508 | |
| 0 | 0 | 70.5 |
| 0 | 0.1 | 22.8 |
| 0 | 0.15 | 21.6 |
| 0 | 0.2 | 22.5/22.8 |
| 0 | 0.3 | 20.2/20.4 |
| 0.05 | 0.15 | 26.5 |
| 0.1 | 0 | 30.0 |
| 0.1 | 0.1 | 28.4/28.4 |
| 0.1 | 0.15 | 28.0 |
| 0.1 | 0.2 | 27.4 |
| 0.1 | 0.3 | 26.3 |
| 0.15 | 0.05 | 30.0 |
| 0.2 | 0 | 30.4/31.5 |
| 0.2 | 0.1 | 29.7 |
| 0.2 | 0.15 | 29.0 |
| 0.2 | 0.2 | 28.4 |
| 0.2 | 0.3 | 27.6 |
| 0.3 | 0.1 | 30.3 |
| 0.3 | 0.15 | 29.7 |
| 0.3 | 0.2 | 29.3 |
| 0.3 | 0.3 | 28.7 |
| 0.35 | 0 | 30.4 |
| 0.5 | 0 | 30.5 |

A final series of tests was conducted to measure surfactant absorption on sand representative of a type likely to be found in a typical subterranean formation. First, surface tension data was run on each of the '168 Blend, the '508 Blend, and on a 3:2 volume mixture of the two blends, at various dilute concentrations bridging the critical micelle concentration for each surfactant. Various 2 percent KCl solutions were prepared containing the concentration of the respective Blends indicated in Table 17. 250 Grams of 20–40 mesh (U.S. Sieve Series) Ottawa sand was slurried with 250 ml of each solution, and the slurry was agitated for 24 hours. Then, an aliquot of the liquid was removed and diluted to a concentration less than the critical micelle concentration for that surfactant. From the surface tension of the diluted aliquot, the concentration of the surfactant in the diluted aliquot was obtained from the respective plot, and knowing the dilution factor, the concentration of the surfactant remaining in the liquid of the slurry was calculated. In determining the surfactant loss in the combined blend of the present invention, it has been assumed that the '168 Blend and '508 Blend portions of the combined blend will each be depleted from the combined blend at approximately the same rate. The assumption is believed justified since each exhibited the same volume percent depletion when tested alone, i.e., 50%. Results and calculations are shown in Table 17, and demonstrate that loss of active surfactant is considerably reduced by the presence of all four components in the blend over what would be predicted from the performances of each of the '508 and '168 Blends alone.

TABLE 17
ABSORPTION TESTS

| | | | | |
|---|---|---|---|---|
| (a) | Surfactant and Initial Concentration | 0.3 Vol.% '168 Blend +0.2 Vol.% '508 Blend | 0.3 Vol. % '508 Blend | 0.3 Vol.% '168 Blend |
| (b) | Final Concentration (From Surface Tension) | 0.24% '168 Blend +0.16% '508 Blend | 0.15% | 0.15% |
| (c) | Volume % Lost (a = b = c) | 0.06% '168 Blend +0.04% '508 Blend | 0.15% | 0.15% |
| (d) | Specific Gravity | — | 0.92 | 0.885 |
| (e) | Weight Percent Active | — | 20.5 | 50.0 |
| (f) | Weight Percent Active Lost (c × d × e = f) | (A+B) .02655 (C+D) .00754 Total .0341 | (C+D) .0283 | (A+B) .0665 |

And, since approximately 1 gram of sand was employed per gram of solution,

| | | | | |
|---|---|---|---|---|
| (g) | Micrograms Active Ingredient Lost Per Gram of Sand | (A+B) 266 (C+D) 75 Total 341 | (C+D) 283 | (A+B) 665 |

What is claimed is:

1. A composition suitable for imparting foaming and silt suspending properties to aqueous based fluids of the type suitable for use in treating subterranean formations, comprising a blend of:

(A) at least one alkyltrimethylammonium chloride, wherein the alkyl chain length is from 8 to 18 carbon atoms and the mode alkyl chain length is 12 or 14 carbon atoms;

(B) an amine oxide selected from the group consisting of bis-(2-hydroxyethyl) cocoamine oxide, dimethylhexadecylamine oxide, and dimethylhydrogenated tallowamine oxide;

(C) an adduct of trimethyl-1-heptanol plus seven moles of ethylene oxide; and (D) a perfluorinated surfactant of the formula

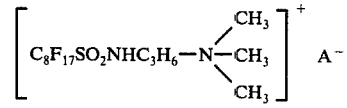

wherein $A^-$ is $Cl^-$, $F^-$, $I^-$, or $Br^-$; wherein

Components (A) and (B) are in a synergistic weight ratio to one another within the range of from about 99:1 to about 1:99;

Components (C) and (D) are in a weight ratio to one another of from about 1:1 to about 40:1, and the combined amounts of Components (A) and (B) and the combined amounts of Components (C) and (D) in said composition are such that said composition can be diluted with an aqueous based fluid to yield a foamable fluid containing Components (A) and (B) in a combined concentration of from about 0.035 to about 0.5 weight percent and Components (C) and (D) in a combined concentration of from about 0.03 to about 0.1 weight percent.

2. The composition of claim 1 wherein Component (A) and Component (B) are in a weight ratio to one another of
   i. from about 45:55 to about 85:15 when
      Component (A) is cocotrimethyl ammonium chloride and
      Component (B) is bis-(2-hydroxyethyl) cocoamine oxide, and
   ii. from about 40:60 to about 95:5 when said Components (A) and (B) are selected so as to provide a combination other than cocotrimethyl ammonium chloride and bis-(2-hydroxyethyl) cocoamine oxide.

3. The composition of claim 2 wherein the combined amounts of Components (A) and (B) and the combined amounts of Components (C) and (D) in said composition are such that said composition can be diluted with an aqueous based fluid to yield a foamable fluid containing Components (A) and (B) in a combined concentration of from about 0.045 to about 0.18 weight percent and Components (C) and (D) in a combined concentration of from about 0.03 to about 0.1 weight percent.

4. The composition of claim 1 wherein the combined amounts of Components (A) and (B) and the combined amounts of Components (C) and (D) in said composition are such that said composition can be diluted with an aqueous based fluid to yield a foamable fluid containing Components (A) and (B) in a combined concentration of from about 0.035 to about 0.5 weight percent and Components (C) and (D) in a combined concentration of from about 0.037 to about 0.07 weight percent.

5. The composition of claim 1 wherein Component (A) is cocotrimethyl ammonium chloride, Component (B) is bis-(2-hydroxyethyl) cocoamine oxide, and Components (A) and (B) are in a weight ratio to one another of from about 45:55 to about 85:15.

6. The composition of claim 5 wherein Components (A) and (B) are in a weight ratio to one another of from about 60:40 to about 80:20.

7. The composition of claim 6 wherein in Component (D), $A^-$ is $I^-$, and wherein the combined amounts of Components (A) and (B) and the combined amounts of Components (C) and (D) in said composition are such that said composition can be diluted with an aqueous based fluid to yield a foamable fluid containing Components (A) and (B) in a combined concentration of from about 0.045 to about 0.18 weight percent and Components (C) and (D) in a combined concentration of from about 0.037 to about 0.07 weight percent.

8. A foam comprised of an aqueous based fluid, an inert gas, and a blend of
   (A) at least one alkyltrimethylammonium chloride, wherein the alkyl chain length is from 8 to 18 carbon atoms and the mode alkyl chain length is 12 or 14 carbon atoms;
   (B) an amine oxide selected from the group consisting of bis-(2-hydroxyethyl) cocoamine oxide, dimethylhexadecylamine oxide, and dimethylhydrogenated tallowamine oxide;
   (C) an adduct of trimethyl-1-heptanol plus seven moles of ethylene oxide; and
   (D) a perfluorinated surfactant of the formula

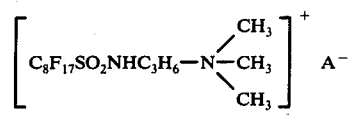

wherein $A^-$ is $Cl^-$, $F^-$, $I^-$, or $Br^-$; wherein
Components (A) and (B) are in a synergistic weight ratio to one another within the range of from about 99:1 to about 1:99;
Components (C) and (D) are in a weight ratio to one another of from about 1:1 to about 40:1,
Components (A) and (B) are present in a combined amount of from about 0.035 to about 0.5 percent based on the weight of the liquid phase of said foam, and
Components (C) and (D) are present in a combined amount of from about 0.03 to about 0.1 percent based on the weight of the liquid phase of said foam.

9. The foam of claim 8 wherein Component (A) and Component (B) are in a weight ratio to one another of
   i. from about 45:55 to about 85:15 when Component (A) is cocotrimethyl ammonium chloride and Component (B) is bis-(2-hydroxyethyl) cocoamine oxide, and
   ii. from about 40:60 to about 95:5 when said Components (A) and (B) are selected so as to provide a combination other than cocotrimethyl ammonium chloride and bis-(2-hydroxyethyl) cocoamine oxide.

10. The foam of claim 9 wherein Components (A) and (B) are present in a combined amount of from about 0.035 to about 0.5 percent based on the weight of the liquid phase of said foam, and Components (C) and (D) are present in a combined amount of from about 0.037 to about 0.07 percent based on the weight of the liquid phase of said foam.

11. The foam of claim 8 wherein Components (A) and (B) are present in a combined amount of from about 0.035 to about 0.5 percent based on the weight of the liquid phase of said foam, and Components (C) and (D) are present in a combined amount of from about 0.037 to about 0.07 percent based on the weight of the liquid phase of said foam.

12. The foam of claim 8 wherein Component (A) is cocotrimethyl ammonium chloride, Component (B) is bis-(2-hydroxyethyl) cocoamine oxide, and Components (A) and (B) are in a weight ratio to one another of from about 45:55 to about 85:15.

13. The foam of claim 12 wherein Components (A) and (B) are in a weight ratio to one another of from about 60:40 to about 80:20.

14. The foam of claim 13 wherein in Component (D), $A^-$ is $I^-$, and wherein Components (A) and (B) are present in a combined amount of from about 0.045 to about 0.18 percent, or about 0.13–0.4 percent where the liquid phase comprises an inhibited mineral acid, based on the weight of the liquid phase of said foam, said Components (C) and (D) are present in a combined amount of from about 0.037 to about 0.07 percent based on the weight of the liquid phase of said foam.

15. The foam of claim 8 wherein the aqueous based fluid is an acid.

16. The foam of claim 15 wherein the aqueous based fluid is inhibited HCl.

17. The foam of claim 8 wherein the aqueous based fluid contains zirconium oxychloride.

18. The foam of claim 8 wherein the aqueous based fluid is a brine.

19. A method of treating a subterranean formation penetrated by a borehole, comprising injecting into the formation via the borehole, an aqueous based fluid mixed with an inert gas to form a foam and containing a foaming and silt suspending quantity of a blend of (A) at least one alkyltrimethylammonium chloride, wherein the alkyl chain length is from 8 to 18 carbon atoms and the mode alkyl chain length is 12 or 14 carbon atoms, and (B) an amine oxide selected from the group consisting of bis-(2-hydroxyethyl) cocoamine oxide, dimethylhexadecylamine oxide, and dimethylhydrogenated tallowamine oxide, (C) an adduct of trimethyl-1-heptanol plus seven moles of ethylene oxide, and (D) a perfluorinated surfactant of the formula

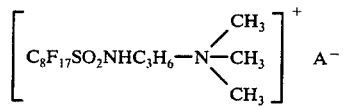

wherein $A^-$ is $Cl^-$, $F^-$, $I^-$, or $Br^-$, wherein Components (A) and (B) are present in a synergistic weight ratio to one another of from about 99:1 to about 1:99 and together are present in a combined concentration of from about 0.035 to about 0.5 percent by weight of the aqueous based fluid, and Components (C) and (D) are present in a weight ratio to one another of from about 1:1 to about 40:1 and together are present in a combined concentration of from about 0.03 to about 0.1 percent by weight of the aqueous based fluid.

20. The method of claim 19 wherein Component (A) and Component (B) are in a weight ratio to one another of i. from about 45:55 to about 85:15 when
Component (A) is cocotrimethyl ammonium chloride and
Component (B) is bis-(2-hydroxyethyl) cocoamine oxide, and ii. from about 40:60 to about 95:5 when said Components (A) and (B) are selected so as to provide a combination other than cocotrimethyl ammonium chloride and bis-(2-hydroxyethyl) cocoamine oxide.

21. The method of claim 19 wherein Components (A) and (B) are present in a combined concentration of from about 0.045 to about 0.18 percent, or about 0.13–0.4 percent where the aqueous based fluid comprises an inhibited mineral acid, by weight of the aqueous based fluid.

22. The method of claim 21 wherein Component (A) and Component (B) are in a weight ratio to one another of i. from about 45:55 to about 85:15 when
Component (A) is cocotrimethyl ammonium chloride and
Component (B) is bis-(2-hydroxyethyl) cocoamine oxide, and ii. from about 40:60 to about 95:5 when said Components (A) and (B) are selected so as to provide a combination other than cocotrimethyl ammonium chloride and bis-(2-hydroxyethyl) cocoamine oxide.

23. The method of claim 19 wherein Components (C) and (D) are present in a combined concentration of from about 0.037 to about 0.07 percent by weight of the aqueous based fluid.

24. The method of claim 19 wherein Component (A) is cocotrimethyl ammonium chloride, Component (B) is bis-(2-hydroxyethyl) cocoamine oxide, and Components (A) and (B) are in a weight ratio to one another of from about 45:55 to about 85:15.

25. The method of claim 24 wherein Components (A) and (B) are in a weight ratio to one another of from about 60:40 to about 80:20.

26. The method of claim 25 wherein Component (D), $A^-$ is $I^-$, and wherein Components (A) and (B) are present in a combined amount of from about 0.045 to about 0.18 percent, or about 0.13–0.4 percent where the aqueous liquid comprises an inhibited mineral acid, based on the weight of the aqueous fluid, and Components (C) and (D) are present in a combined amount of from about 0.037 to about 0.07 percent based on the weight of the aqueous fluid.

27. The method of claim 19 wherein the aqueous based fluid is an organic or mineral acid capable of dissolving a portion of said formation and said acid is injected into said borehole as a foam.

28. The method of claim 19 wherein the aqueous based fluid is injected into the borehole as a foam at a sufficient rate and pressure to fracture the formation.

29. The method of claim 28 wherein the aqueous based fluid also contains a gelling agent.

* * * * *

UNITED STATES PATENT AND TRADEMARK OFFICE
CERTIFICATE OF CORRECTION

PATENT NO. : 4,108,782
DATED : August 22, 1978
INVENTOR(S) : James L. Thompson

It is certified that error appears in the above-identified patent and that said Letters Patent are hereby corrected as shown below:

```
Col. 1, line 25, change "and/of" to "and/or".
Col. 2, line 67, after "Blend" insert --further--.
Col. 4, line 65, after "trimethylammonium" insert --chloride--.
Cols. 7&8, Table 2, col. 6, change "Armox" to "Aromox".
  "      "    "    ", col. 7, change "Armomox" to "Aromox".
  "      "    "    "  "    ", delete "Aromox" and insert --12/50--.
Col. 10, line 54, change "slit" to "silt".
Col. 11, Table 8, col. 1, after "Test" insert --No.--.
Col. 12, line 32, change "ast" to "last".
Col. 13, Table 11, last col., delete the "(" before "Volume".
Col. 18, Table 17, second col., change "(a=b=c)" to "(a-b=c)".
Col. 18, Table 17, test (f), last col., insert --(-- before
                                                  "A+B)".
Col. 22, Claim 26, line 34, after "wherein" insert --in--.
```

Signed and Sealed this

Third Day of April 1979

[SEAL]

Attest:

RUTH C. MASON
Attesting Officer

DONALD W. BANNER
Commissioner of Patents and Trademarks